United States Patent [19]

Yoshii

[11] Patent Number: 4,950,025

[45] Date of Patent: Aug. 21, 1990

[54] AUTOMOBILE REAR BODY STRUCTURE

[75] Inventor: Noboru Yoshii, Hiroshima, Japan

[73] Assignee: Mazda Motor Corporation, Hiroshima, Japan

[21] Appl. No.: 328,985

[22] Filed: Mar. 27, 1989

[30] Foreign Application Priority Data

Mar. 25, 1988 [JP] Japan .................................. 63-72357

[51] Int. Cl.$^5$ ............................................. B62D 27/02
[52] U.S. Cl. ..................................... 296/195; 296/188
[58] Field of Search ................. 296/195, 188, 185, 198

[56]  References Cited

U.S. PATENT DOCUMENTS

| 4,234,225 | 11/1980 | Harasaki et al. | |
| 4,471,992 | 9/1984 | Matsuura et al. | 296/195 |
| 4,516,803 | 5/1985 | Kaltz et al. | 296/195 |
| 4,652,044 | 3/1987 | Harasaki | 296/195 |
| 4,682,812 | 7/1987 | Hurten et al. | 296/195 |

Primary Examiner—Robert R. Song
Attorney, Agent, or Firm—Fleit, Jacobson, Cohn, Price, Holman & Stern

[57] ABSTRACT

A rear body structure of an automobile body having rear side walls with rear fenders, inner panels and rear wheel houses which are assembled to form a space. A side sill extends along each side of the automobile body. A rear deck is provided between the side walls above the rear wheel houses. In the space defined in the side wall, a reinforcement member is connected to the inner panel so as to form a closed cross-section therebetween and interconnects the side sill and the rear deck means.

16 Claims, 6 Drawing Sheets

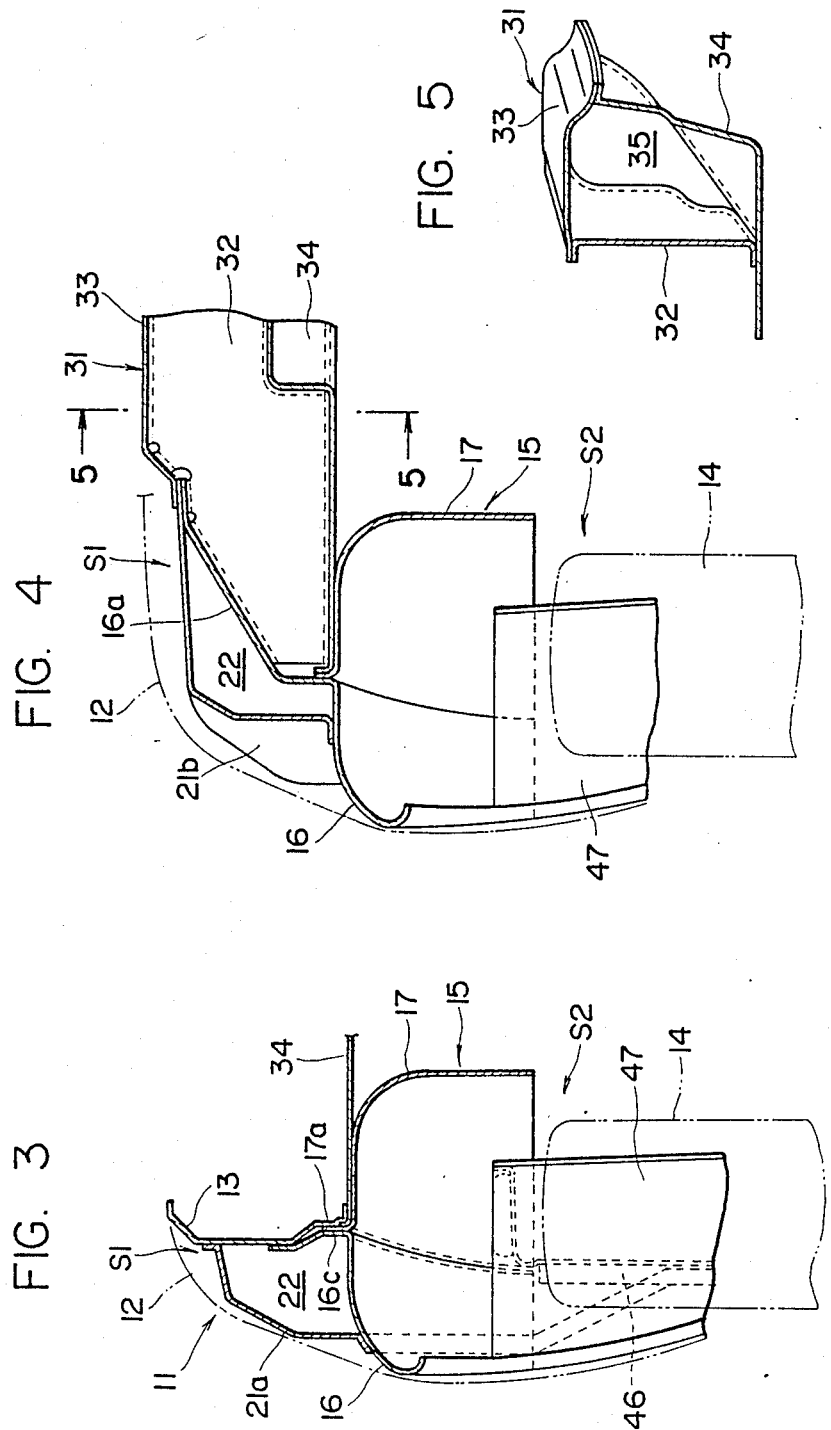

AUTOMOBILE REAR BODY STRUCTURE

FIELD OF THE INVENTION

The present invention relates to an automobile body structure, and more particularly to an automobile rear body structure having a high structural rigidity and strength against road shock.

BACKGROUND OF THE INVENTION

An automobile rear body is structured with left and right rear fenders forming an outer side wall of the rear body, left and right inner panels forming an inner wall of the rear body and left and right rear wheel houses covering rear wheels that are secured one another.

Such an automobile rear body structure as disclosed in, for example, U.S. Pat. No. 4,234,225 entitled "Rear Reinforcement Structure For Automobile Bodies" issued Nov. 18, 1980, includes a reinforcement member extending in a lengthwise direction of the automobile body above each wheel house. The reinforcement member is attached to the inner panel forming an inner wall of the automobile rear body, whereby a closed cross-section is formed therebetween, so as to improve the rigidity and strength of the automobile rear body.

The reinforcement member is desirably connected to the upper portion of the wheel house so as effectively to distribute external force or road shock transmitted from a rear wheel and its associated suspension to structural elements of the automobile rear body.

In conventional automobile bodies, because rear side walls themselves are insufficient in structural rigidity and strength, external force or road shock from the wheel and its suspension should be transmitted through the reinforcement member and center and rear pillars to partly bear on a top roof so as to be sufficiently distributed. Such conventional automobile bodies, therefore, require center and rear pillars and a top roof which is highly improved in structural rigidity and strength. This requirement leads to some design limitations of the pillars and top roof and their associated structural elements.

Furthermore, incorporating reinforcement members is not always sufficient to provide rear bodies of, in particular, convertible automobiles with high rigidity and strength.

SUMMARY OF THE INVENTION

It is, therefore, a primary object of the present invention to provide an automobile body with a novel rear body structure which is rigid and strong.

The object of the present invention is achieved by an automobile body with a rear body structure comprising rear side walls consisting of rear fenders, inner panels and rear wheel houses which are assembled to form a space. A side sill extends along a side of the automobile center body section. A rear deck is provided between the side walls above the wheel houses. In the space defined in the side wall, there is a reinforcement member connected to the inner panel so as to form a closed cross-section therebetween and interconnecting the side sill and the rear deck means.

Because of the provision of the reinforcement member along the rear wheel house, the side walls constituting a rear body structure can have highly improved or increased rigidity and strength against an external force or road shock transmitted from the rear suspensions. Additionally, the interconnection between the side sill and rear deck means with a reinforcement member can distribute external force or road shock transmitted from the rear suspensions to the side sill and rear deck means as well a the side walls.

The rear body structure in accordance with the present invention, which can provide highly improved or increased rigidity and strength against an external force or road shock transmitted from the rear suspensions, is more effectively embodied, particularly, in convertible automobile bodies or so-called "hard top" automobile bodies which have no center pillars.

BRIEF DESCRIPTION OF THE DRAWINGS

Still other aspects of the invention and more specific features will become apparent to those skilled in the art from the following description of the preferred embodiment considered together with the accompanying drawings in which:

FIG. 3 is a cross-sectional view of FIG. 2 taken along line A—A;

FIG. 4 is a cross-sectional view of FIG. 2 taken along line B—B;

FIG. 5 is a cross-sectional view of FIG. 4 taken along line C—C;

DETAILED DESCRIPTION OF THE PREFERRED EMBODIMENT

An automobile body is constructed from a center body section constituting a passenger compartment, a front body section having room for an engine and a rear body section constituting a trunk room. Because the structure of the center and front car body section is well known to those skilled in the art, this description will be directed in particular to parts or elements forming part of, or cooperating directly with, the rear body structure embodying the present invention. It is to be understood that the structure of the center and front car bodies may take various forms known to those skilled in the automobile art.

Figure 1:
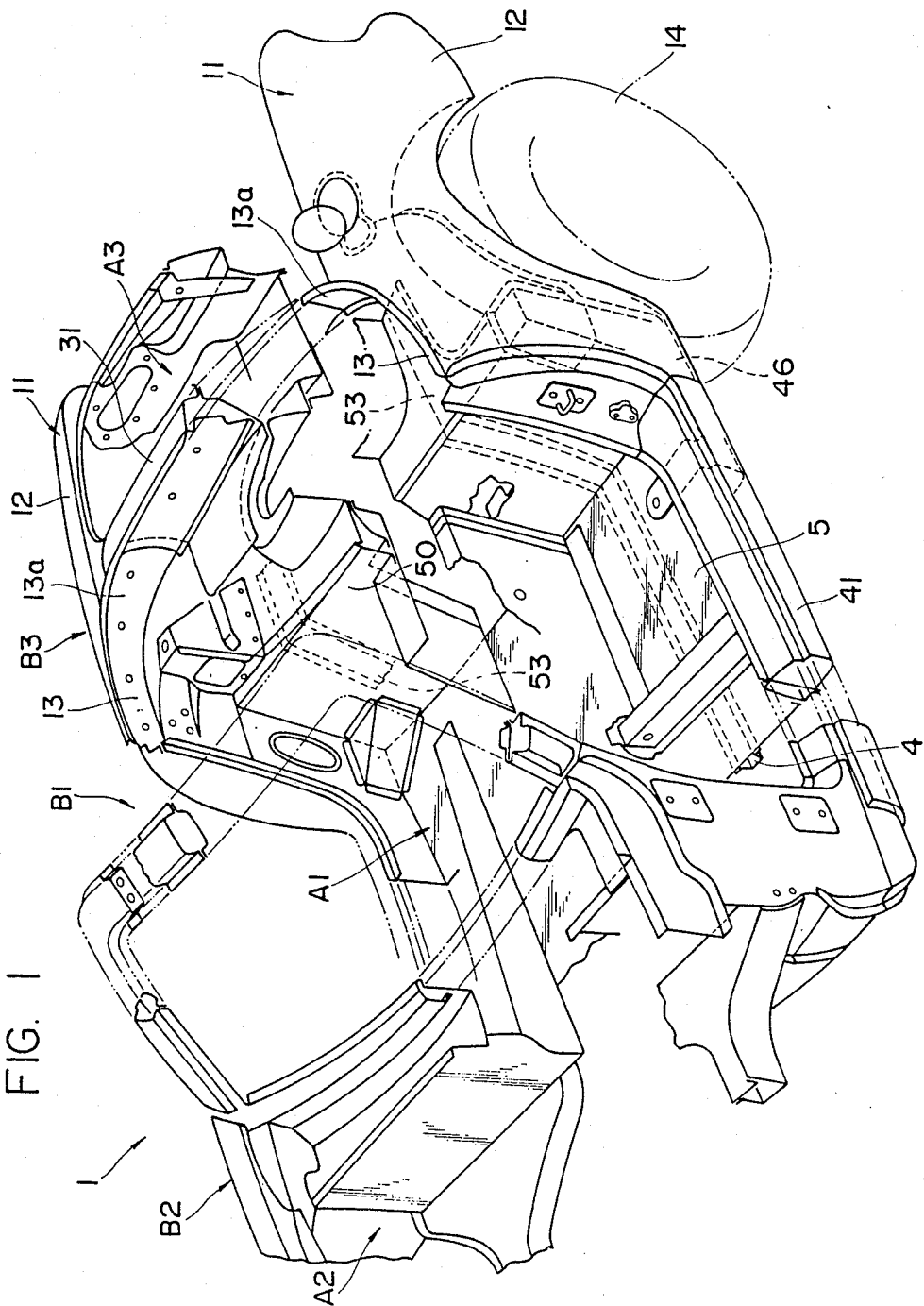
FIG. 1 is an exploded perspective view showing a convertible automobile body in accordance with a preferred embodiment of the present invention with a front body section cut away, in which a front body section is cut away.
Figure 2:
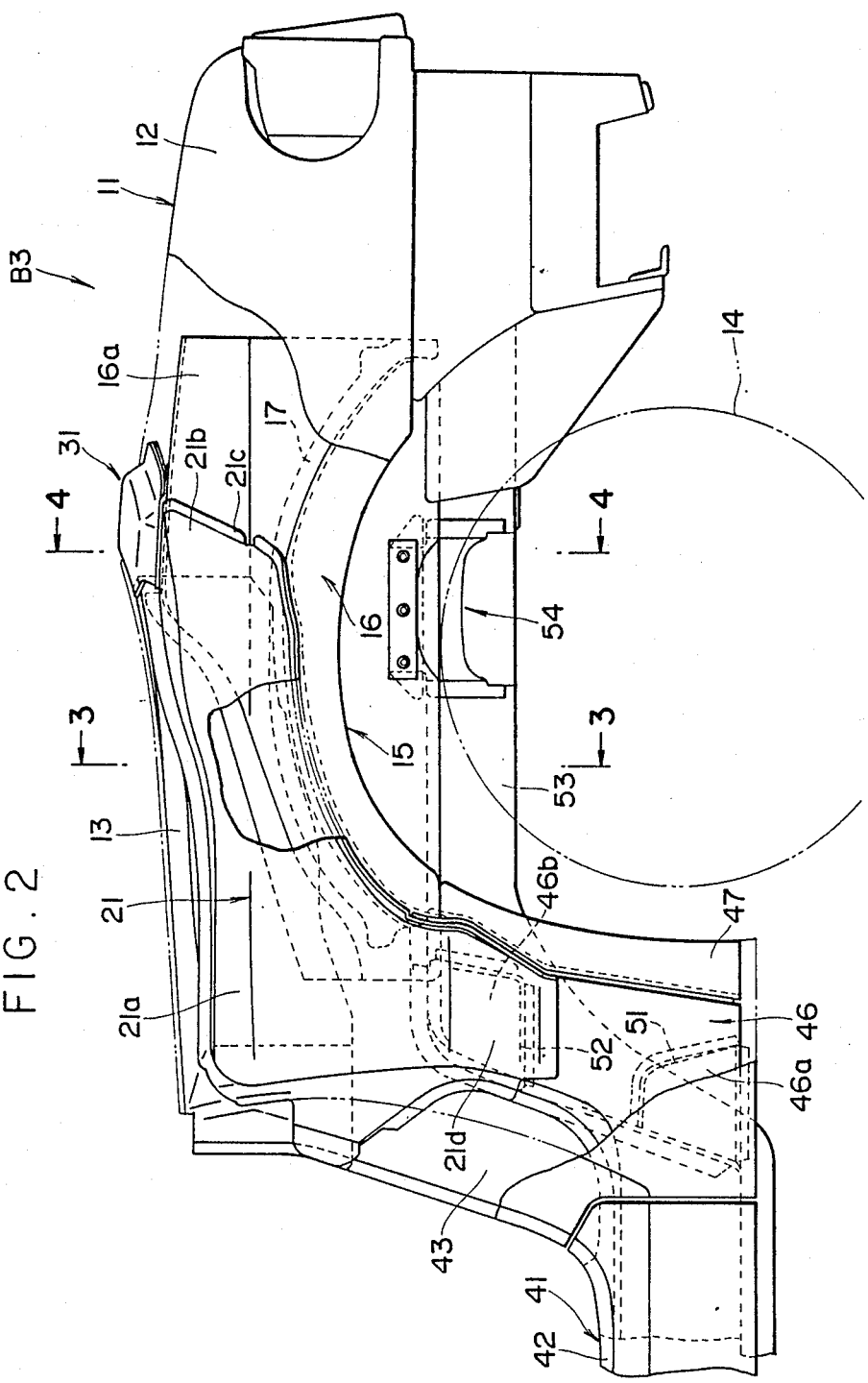
FIG. 2 is a side view of the automobile body shown in FIG. 1.
Figure 6:
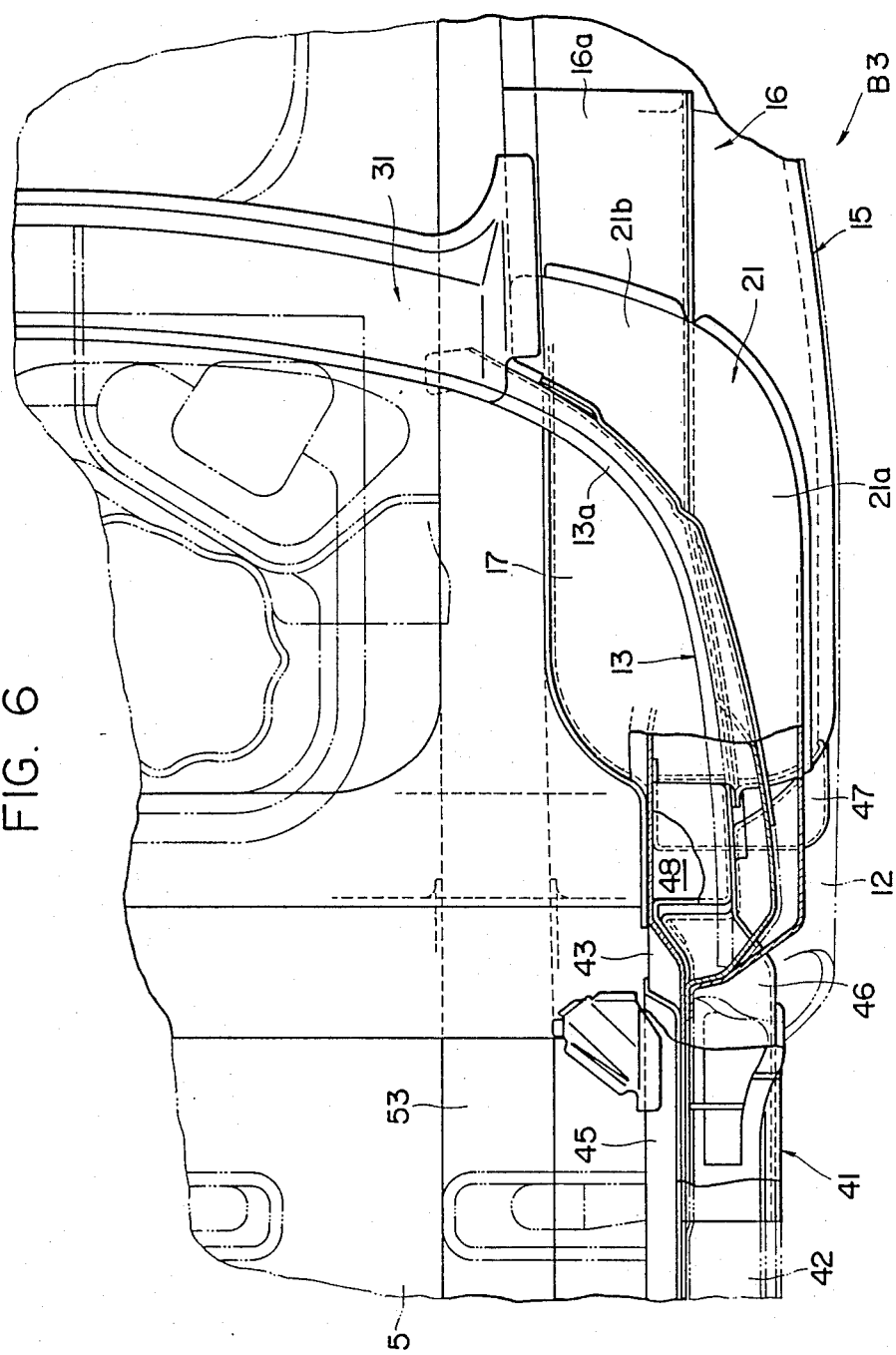
FIG. 6 is a partial plan view of the automobile body shown in FIG. 1.
Figure 7:
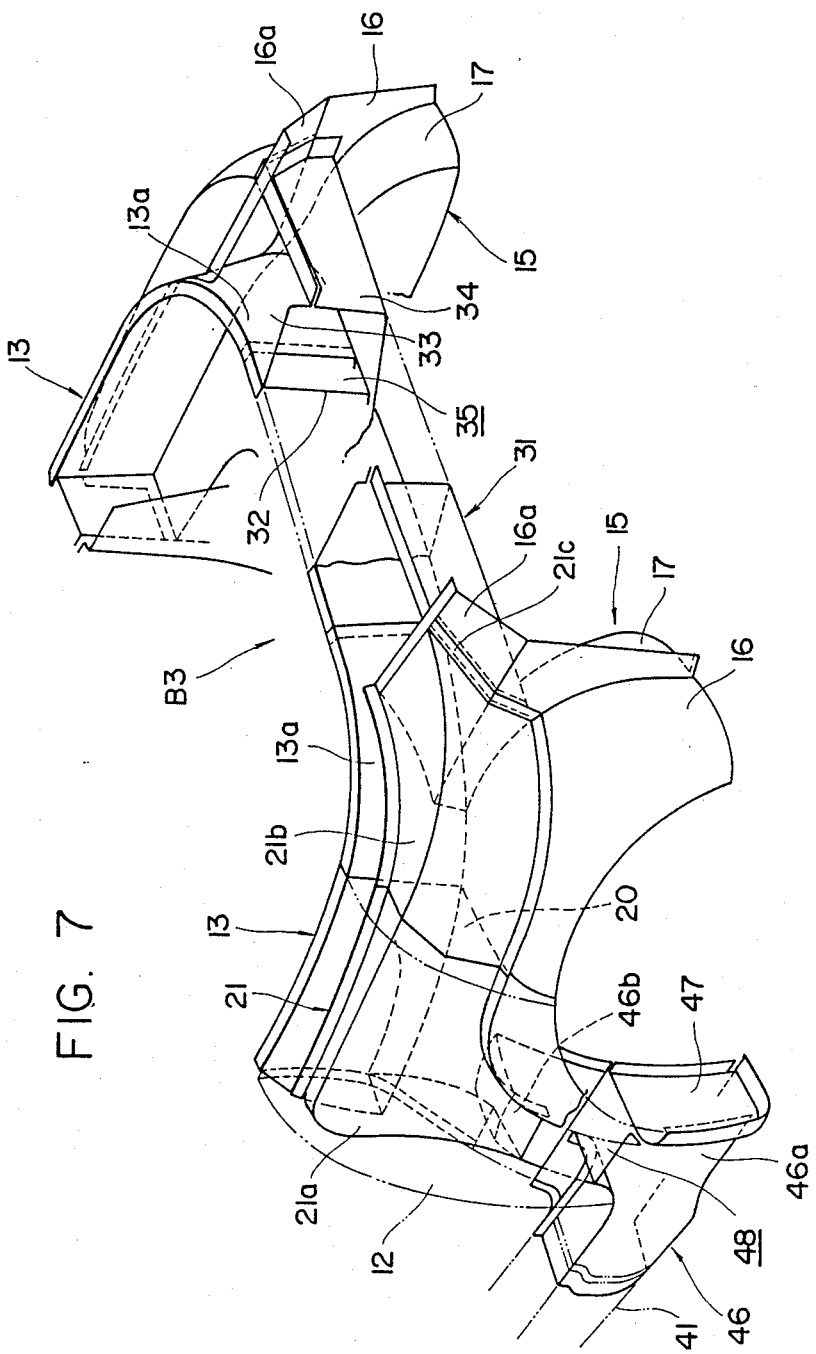
FIG. 7 is a perspective view showing a rear body section.
Figure 8:
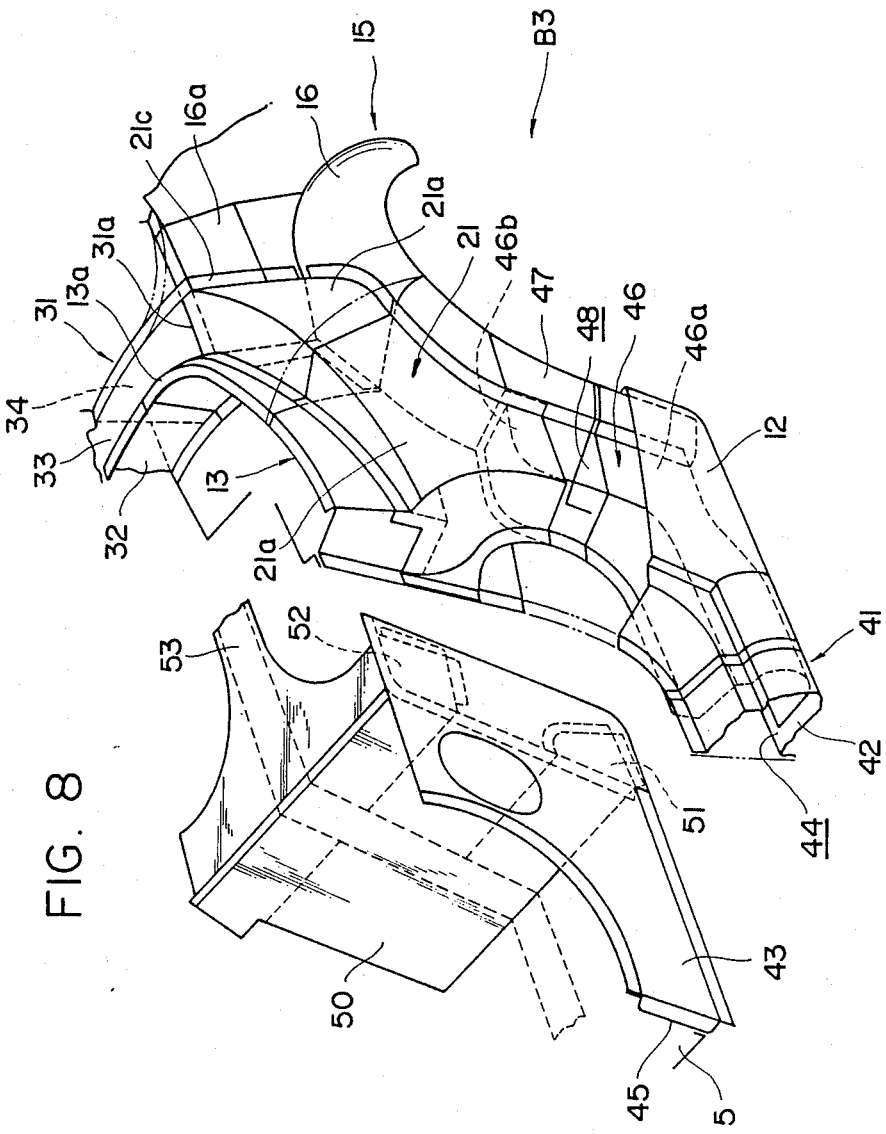
FIG. 8 is an exploded perspective view showing a left half of the rear body section shown in FIG. 7.

Referring to the drawings in detail, particularly to FIG. 1, an automobile body 1 having a convertible top (not shown) is shown, and includes a center body section B1 constituting a passenger compartment A1, a front body section (partly shown) B2 forming an engine room A2, and a rear body section B3 constituting a trunk room A3. The front body section B2 and the rear body section B3 are interconnected by way of box-channeled left and right side frame members 4, left and right side sills 41 (only the left side sill 41 is shown) extending along opposite lower sides of the center body section B1 between the front and rear body sections B2 and B3, and a floor panel 5.

The rear body section B3 is formed by left and right side walls or shells 11 comprising left and right rear fenders 12 forming outer shell walls, left and right inner panels 13 forming inner shell walls, and left and right wheel houses 15 for covering left and right rear wheels 14. These side shell elements are welded to one another to form a space S1 above each wheel 14. Each wheel house 15 is constructed from a wheel house outer portion 16 and a wheel house inner portion 17 welded along their upper flanges 16a and 17a to define or form an inner space S2 for receiving partly therein a rear wheel 14.

A reinforcement member 21, which has a generally L-shaped cross section, is provided in the space S1 defined in the side shell 11 along the wheel house 15. Member 21 is welded to the upper surface of the wheel house outer portion 16 and an upper side portion of the inner panel 13 so as to form a closed cross-section 22. The inner panel 13 has an integral rear portion 13a bent and extending inward. The reinforcement member 21 is divided into a front half section 21a and a rear half section 21b bent inward to fit the outer surface of the rear portion 13a of the inner panel 13. A partition wall or bulkhead stiffener member 20 is provided between the front and rear half sections 21a and 21b of the reinforcement member 21 in the space S1. The bulkhead stiffener member 20 may be welded to either one of the front and rear half sections 21a and 21b of the reinforcement member 21. This bulkhead stiffener member 20 functions as a nodal line of vibration of the reinforcement member 21, so as to contribute to or enhance the stiffness of the reinforcement member 21. The wheel house outer portion 16 is integrally formed with a tail-fin like member 16a rising straight up from the rear half section of the wheel house outer-portion 16 and bending inward at an appropriate angle. The reinforcement member 21 is connected near the rear end 21c of the rear half section 21b thereof to the tail-fin like member 16a of the wheel house outer portion 16 only to form rear part of the closed cross-section 22. An end 31a of a rear deck assembly 31, which will be described in detail later, is connected to the opposite surface of the tail-fin like member 16a of the rear wheel house outer portion 16. The tail-fin like member 16a, like the bulkhead stiffener member 20, functions as a nodal line of vibration of the reinforcement member 21, so as to contribute to or enhance the stiffness of the reinforcement member 21.

A rear deck assembly 31, which extends transversely between the left and right side shells 11, consists of a rear deck member 32, a rear deck panel 33 and a bulkhead panel 34 assembled as an integral whole to form a closed cross-section 35. The rear deck assembly 31 is attached with the inwardly bent rear portion 13a of the inner panel 13, the tail-fin like member 16a of the rear wheel house outer portion 16 and the inwardly bent rear half section 21b of the reinforcement member 21, thereby interconnecting rigidly the left and right side shells 11.

A corner junction member 46 is provided and is configured substantially in an L-shape to interconnect a front lower portion of the front half section 21a of the reinforcement member 21 and the rear end of the side sill 41 by a well known manner, such as by welding. In more detail, the side sill 41 consists of a channel shaped side sill outer portion 42 and a side sill inner portion 43 welded each other to form a closed cross-section 44. A reinforcement member 45 is attached to the inner surface of the side sill 41 to reinforce the side sill 41. The corner junction 46 coacts with the side sill inner portion 43 and a sealing plate 47 secured to a front half of the rear wheel house 15 so as to form a closed cross-section 48 therebetween.

The left and right corner junction members 46 are connected to each other at curved portions 46a by a lower rear cross member 51 and at upper ends by an upper rear cross member 52. The cross members extend along the back of the rear partition wall 50. The lower and upper rear cross members 51 and 52 are connected to left and right rear frames 53 which are connected, at their front ends, to the front body section B2 through the left and right side members 4, respectively, and, at their rear ends, directly to the left and right wheel houses 15, respectively. Each rear frame 53 is provided near the rear end thereof with a bracket 54 for mounting a rear suspension assembly (not shown).

The provision of the reinforcement member 21 along the outer periphery of the wheel house 15 forms a closed cross-section between the reinforcement member 21 and the wheel house 15, so as to contribute to or increase the rigidity and strength of the rear body section B3. Furthermore, external force or road shock from the rear wheels 15 and the associated suspension assemblies is transmitted to the left and right rear frames 53. Such external force or vibration is distributed among the lower and upper rear cross members 51 and 52 and the wheel houses secured to the rear frames 53, and further transmitted to the side sills 41 and the rear deck assembly 31 through the corner junctions 46 and the reinforcement members 21. That is, the external force or road shock transmitted from the wheels 14 can be distributed to the whole structure of the rear body section B3, owing to the connection between the side sills 41 and the rear deck 31 by way of the reinforcement members 21 that are provided along the wheel houses 15, respectively, and have a closed cross-section.

It is to be understood that whereas the invention has been described in detail with respect to a preferred embodiment, nevertheless, various other embodiments and variants are apparent to those skilled in the art which are within the spirit and scope of the invention, and such embodiments and variants are intended to be covered by the following claims.

What is claimed is:

1. A rear body structure of an automobile body consisting of rear side walls each of which consists of a rear fender member, an inner panel member and a rear wheel house said rear body structure comprising:
   side sill means extending along opposite sides of the automobile body in a lengthwise direction of the automobile body;
   rear deck means extending in a widthwise direction of the automobile body above the rear wheels houses, and
   reinforcement means ragidly connected between an outer portion of said wheel house and said inner panel member and interconnecting said side sill and said rear deck means.

2. A rear body structure as defined in claim 1, wherein said reinforcement means extends along and is connected to said inner panel member to form a closed cross-section therebetween.

3. A rear body structure as defined in claim 2, wherein said side sill means has a closed cross-section and includes a side sill reinforcement member extending in said side sill means, said reinforcement means being connected to a rear end of said side sill reinforcement member.

4. A rear body structure as defined in claim 2, wherein said closed cross-section extends along said rear wheel house.

5. A rear body structure as defined in claim 4, wherein said rear deck means is assembled to form a closed cross-section.

6. A rear body structure as defined in claim 5, wherein said rear deck means consists of a rear deck member, a rear deck panel and a bulkhead panel assembled as an integral whole to form a closed cross-section.

7. A rear body structure as defined in claim 4, wherein said reinforcement means comprises front and rear sections interconnected to each other.

8. A rear body structure as defined in claim 7, further comprising a bulkhead stiffener member provided in said closed cross-section near a junction of said front and rear sections of said reinforcement means.

9. A rear body structure as defined in claim 8, further comprising a cross member extending the width of the automobile body, each end of said cross member being connected to said reinforcement means at a position where said bulkhead stiffener member is provided.

10. A rear body structure as defined in claim 2, further comprising a bulkhead stiffener member in said closed cross-section at a juncture of said reinforcement means and said rear deck means.

11. A rear body structure as defined in claim 10, wherein said bulkhead stiffener member is formed integrally with and extends upward from said rear wheel house.

12. A rear body structure as defined in claim 2, wherein said reinforcement means has a front portion, said front portion extending to an upper rear part of a door opening formed in the automobile body.

13. A rear body structure as defined in claim 12, wherein said automobile body has a convertible top.

14. In an automobile body having a convertible top, a front body section and a center body section including side sill members extending along opposite side thereof, a rear body section comprising:

rear side walls, each of which consists of a rear fender member, an inner panel member and a rear wheel house assembled to form a space;

rear deck means extending in a widthwise direction of the automobile body above and between the rear wheel houses, and reinforcement means rigidly connected to an outer portion of said wheel house and an inner surface of said inner panel member to form a closed cross-section in the space formed in each said rear side wall and interconnecting said side sill members and said rear deck means.

15. An automobile body as defined in claim 14, further comprising a cross member interconnecting said reinforcement means.

16. An automobile body as defined in claim 15, wherein said side sill members each have a side sill reinforcement member to which one end of said reinforcement means is connected.

* * * * *